United States Patent
Yang

[11] Patent Number: 5,891,331
[45] Date of Patent: Apr. 6, 1999

[54] PORTABLE MAGNETIC DEVICE HAVING A CERAMIC BODY AND A HANGER FOR PURIFYING POTABLE WATER

[76] Inventor: Deok He Yang, 302, 645-14, Shin Sa-Dong, Kangnam-ku, Seoul, Rep. of Korea

[21] Appl. No.: 940,532

[22] Filed: Sep. 30, 1997

[30] Foreign Application Priority Data

Oct. 11, 1996 [KR] Rep. of Korea .................. 1996 33495

[51] Int. Cl.$^6$ .................................................. B01D 35/06
[52] U.S. Cl. .............................. 210/222; 210/232; 99/275
[58] Field of Search .................................... 210/222, 232, 210/695; 99/275; 426/234, 237

[56] References Cited

U.S. PATENT DOCUMENTS

| | | | |
|---|---|---|---|
| 4,605,498 | 8/1986 | Kulish | 210/232 |
| 5,556,654 | 9/1996 | Fregeau | 210/222 |

*Primary Examiner*—David A. Reifsnyder
*Attorney, Agent, or Firm*—Birch, Stewart, Kolasch & Birch, LLP

[57] ABSTRACT

The present invention is to provide a device for purifying potable water. A fountain pen shaped body 1 is made of ceramic. In an inner space 2 of the body a magnet 3 is inserted and on an outer lid 6 a hanger 5 is formed, so that the potable water is purified by infrared ray emitted from the bio-ceramic and the potable water is magnetized by magnetic force to obtain effects which promote and improve human health.

5 Claims, 1 Drawing Sheet

PORTABLE MAGNETIC DEVICE HAVING A CERAMIC BODY AND A HANGER FOR PURIFYING POTABLE WATER

FIELD AND BACKGROUND OF INVENTION

The present invention relates to a portable device for purifying potable water that has a body made of ceramic and a shape of a fountain pen magnet such as a plate type magnet, a horseshoe magnet or a bar magnet which is inserted in the body. The invention also includes a cap having a hanger, like a fountain pen does.

PRIOR ART RELATIVE TO INVENTION

Due to an emission effect of infrared rays from bio-ceramic materials, various products adding bio-ceramic materials, e.g, tablewares, containers, devices, or cosmetics, soaps, fertilizers, materials for construction and devices for mild cigarettes, additives for food such as seasonings, have been produced.

However the afore-mentioned bio-ceramic products were manufactured only by addition of bio-ceramic during manufacturing thereof.

More particularly, to purify the potable beverages or foods bio-ceramics were suspended into those products.

In addition, attempts were made to construct a magnet on a faucet or a water pipe to magnetize potable water passing through inside thereof.

However, until now, it was impossible to purify pungent food and drink such as potable water, especially alcoholic drinks with bio-ceramic materials emitting infrared rays, or to magnetize them with magnet within a short period, at anytime and anywhere because it was impossible to bodily carry devices, apparatuses or materials utilizing a ceramic material and a magnet.

SUMMARY OF INVENTION

An object of the present invention is to provide a device capable of being utilized conveniently at anytime and anywhere that promotes healthy blood flow by emission of infrared with bio-ceramic materials and by magnetization with a magnet.

More particularly it is an object of the present invention to provide a device that is hung on the clothes like fountainpens when potable water, drinks, pungent foods and drinks such as alcoholic drinks are agitated with the invention, they are purified and magnetized into foods and drinks useful to the health of a human body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF INVENTION

Figure 1:
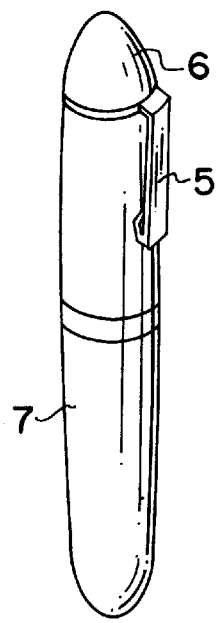
FIG. 1 shows a perspective view of a device in accordance with the present invention
Figure 2:
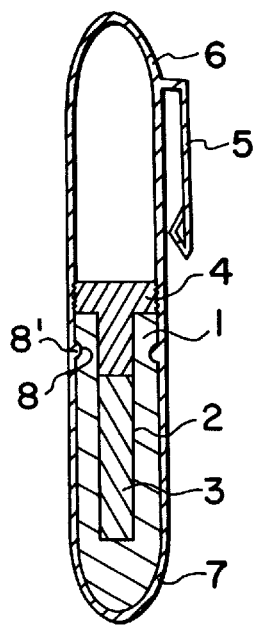
FIG. 2 shows a vertical section of a device in accordance with the present invention.
Figure 3:
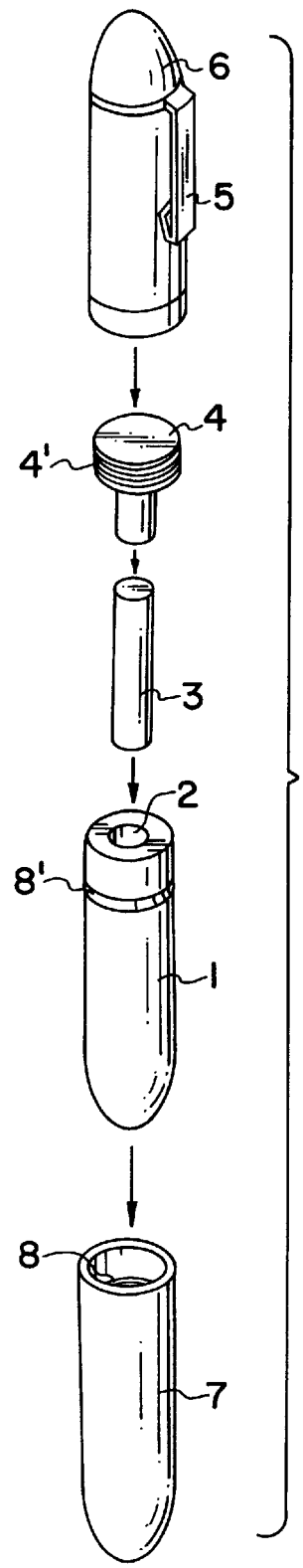
FIG. 3 shows an exploded perspective view of a device in accordance with the present invention.

Now referring to the accompanying drawings the present invention will be described in detail below:

One or more bar magnets or a small plate type magnet 3 are inserted in a lower part of the inner space 2 of a fountainpen type body 1 made of a bio-ceramic material. In the upper part of the inner space 2, an inner lid 4 having screw threads 4' on an outer surface of the upper end is inserted. On the screw threads 4' an outer lid 6 having a hanger 5 is screwed on an outside surface of the body 1 lid 7 has a thickness identical to that of the outer lid 6 and is resiliently connected to the body 1 by coupling an inner projection 8 of the lid 7 to a concave section 8' of the outer surface of the body 1.

The device for the purifying of potable water is hung on clothes by the hanger 5, anytime and anywhere. The invention can be dipped into potable water, pungent alcoholic drinks or teas to agitate the liquids for a relevant period. The liquids are purified to smooth and soften the pungency of the liquids by infrared rays emitted from the bio-ceramic material and also the liquids are also magnetized by the magnet, so that blood circulation is promoted, while digestion and absorption are improved.

Furthermore the device of the present invention is easy and convenient to use and can be carried along with a human body.

What is claimed is:

1. A portable purifying device comprising:

at least one magnet;

a body made of ceramic material, said body emitting infrared rays and surrounding said magnet;

an inner lid having a first set of screw threads disposed on an outside surface of said inner lid;

a first outer lid having a second set of screw threads, said first set of screw threads engaging with said second set of screw threads; and a second outer lid being coupled to and surrounding said body, said first and second outer lids forming a fountain pen shape, whereby said purifying device is readily transportable and substantially purifies potable liquids placed adjacent to said purifying device.

2. The portable purifying device of claim 1, wherein said first outer lid includes a hanger.

3. The portable purifying device of claim 1, wherein said body includes a concave section, and said second outer lid includes a projection which resiliently couples to said concave section.

4. The portable purifying device of claim 1, wherein said first outer lid has a first diameter, said second outer lid has a second diameter, said first diameter being substantially equal to said second diameter.

5. The portable purifying device of claim 1, wherein said at least one magnet has a bar shape.

* * * * *